March 22, 1927.

E. E. SABIN 1,621,519

APPARATUS FOR OPERATING ON PARTS OF SHOES

Filed March 18, 1925

INVENTOR
Ernest E. Sabin
By his Attorney
Nelson W. Howard

Patented Mar. 22, 1927.

1,621,519

UNITED STATES PATENT OFFICE.

ERNEST E. SABIN, OF BEVERLY, MASSACHUSETTS, ASSIGNOR TO UNITED SHOE MACHINERY CORPORATION, OF PATERSON, NEW JERSEY, A CORPORATION OF NEW JERSEY.

APPARATUS FOR OPERATING ON PARTS OF SHOES.

Application filed March 18, 1925. Serial No. 16,361.

This invention relates to apparatus for operating upon parts of shoes and more particularly for assembling parts of shoe uppers. The specific apparatus herein disclosed is especially well adapted for use in assembling the tip and vamp of a shoe upper in accordance with a radically new method of manufacturing shoes which forms the subject of a co-pending application, Serial No. 476,659, filed June 11, 1921, in the name of George E. Warren and assigned to the assignee of the present application. That method provides for standardization of shoe parts and shoe making operations which, as set forth in the said application, is accomplished, in the preparation, assembling and treatment of shoe parts or units, by procedure, therein termed "jigging", to position the parts or units in predetermined relation to each other or to means for operating on them. As a part of the said method, the tip and camp of a shoe upper are each provided with positioning surfaces formed by a pair of jig holes located in exact, predetermined relation to the contours of the respective parts and adjacent to the tip line at opposite sides of the shoe. Then the tip and vamp are assembled in correct relative position by threading the jig holes therein over corresponding locating members, termed jig pins, projecting from a suitable work support and fitting the respective jig holes, after which the parts are permanently secured in this relation either by stitching or by an adhesive.

The present invention aims to provide a simple convenient and efficient apparatus adapted for use in assembling such shoe parts and securing them together by an adhesive although in various aspects the invention is not limited to such use.

A feature of the invention consists in an apparatus, of the general character above indicated, which embodies improved means for removing the shoe parts from one or more work locating members, such as jig pins. As herein illustrated, a stripper for that purpose is actuated by a part which conveniently may be in the form of a platen or press member which has the function, also, of pressing together adhesive-coated portions of the shoe parts which are being assembled. Moreover, in order to provide for the separation of the stripper and the platen so as to permit the ready removal of work lying between them the apparatus preferably includes means for automatically disconnecting the stripper from the platen during the movement of the platen away from work pressing position. In the illustrated construction, the stripper is latched to the platen as the latter rises from such position so that the stripper lifts the work from the work support and from the jig pins and, after the platen has reached a predetermined point in its upward movement, the latch is automatically released, allowing the stripper to fall back on the work support so that the shoe parts may be removed readily from the apparatus.

Furthermore, the present invention comprises other combinations and arrangements of parts and features of construction which will now be described in connection with the accompanying drawings, which illustrate a preferred embodiment of the invention, and will then be pointed out in the appended claims.

Figure 1:
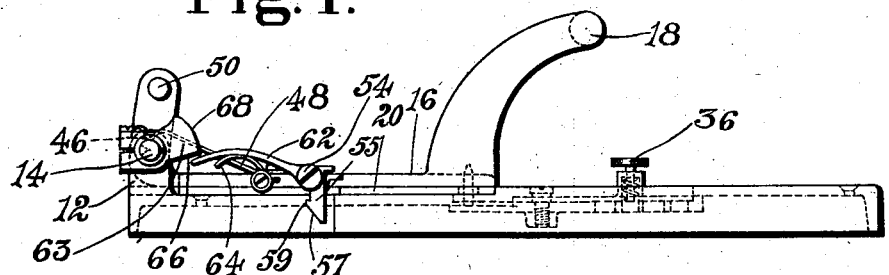
Fig. 1 is a side elevation of an apparatus particularly adapted for use in assembling tips and vamps of shoe uppers.
Figure 2:
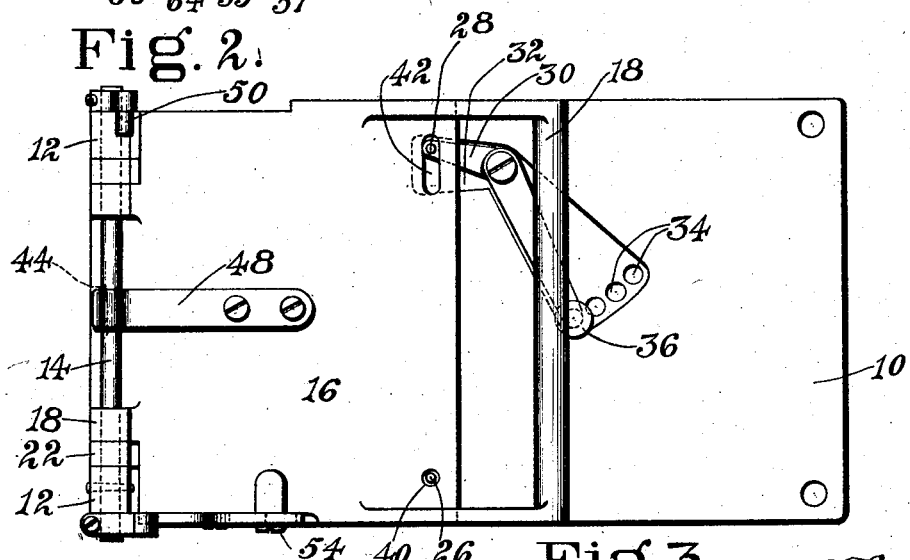
Fig. 2 is a plan view thereof.

As illustrated, the apparatus comprises a work support, or bed plate, 10 having at its rear end upstanding ears 12 in which is fixed a rod 14 which serves as a fulcrum for a swinging platen 16 having hubs 18 to receive the rod 14 which also serves as a fulcrum for a stripper plate 20 having hubs 22. The rear, upper portion of the work support 10 is recessed, as indicated at 24, to such an extent that the stripper plate, in its lowermost position, lies with its surface flush with the forward portion of the upper surface of the work support. Projecting vertically from and secured in the work support is a fixed jig pin 26. Another jig pin 28 is carried by a horizontal bell crank lever 30 which lies in a recess 32 in the upper surface of the work support. A series of holes 34 in the work support are adapted to receive the lower end of a spring pressed locking bolt 36. Through the manipulation of this locking bolt 36 and of bell crank lever 30, the operator may adjust jig pin 28 toward and from jig pin 26 and secure it in any one of several predetermined positions so as to accommodate shoe parts of different sizes. A circular opening 40 and an elongated opening 42 in the platen 16, and corresponding openings in the stripper plate, are provided for the passage of these jig pins 26, 28.

A recess 44 in the rear side of the rod 14 co-operates with a projecting portion 46 of a flat spring 48 secured to the upper side of the platen so that, after the platen has been brought into engagement with a stop 50, the platen remains in raised position while the operator is placing the vamp A and the tip B of a shoe upper in position in the apparatus. In order that the stripper 20 may be raised to lift the upper from the work support 10 and from the pins 26, 28, a bell crank lever is pivoted to the platen at 54, one arm 55 of the lever constituting a latch which lies within a notch or recess 56 in the edge of the stripper, the latch being provided with an inclined surface 57 to co-operate with the rear wall 58 of said notch and being provided also with a shoulder 59 to engage the under side of the stripper plate adjacent to the notch at a point indicated at 60 in Fig. 4. A relatively long spring arm 62, which constitutes the second arm of the bell crank lever mentioned, is pressed normally upward by a spring 64 and, when the parts are in work clamping position, it lies below the lower face 66 of a stationary, but angularly adjustable, abutment 63 which is also provided with a cam surface 68 along which the end of the spring arm 62 moves during the latter portion of the swing of the platen 16 from its lowermost position to its uppermost position against the stop 50.

Figure 3:
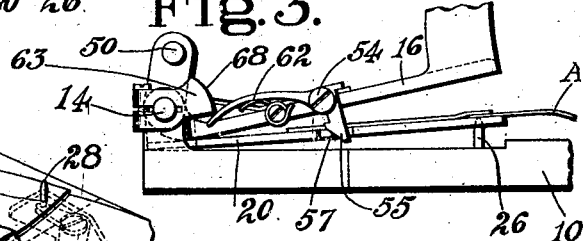
Fig. 3 is a side elevation of a portion of the apparatus shown in Fig. 1 but with the parts in a different operative position and with a tip and vamp of a shoe upper lying between the platen and the stripper.
Figure 4:
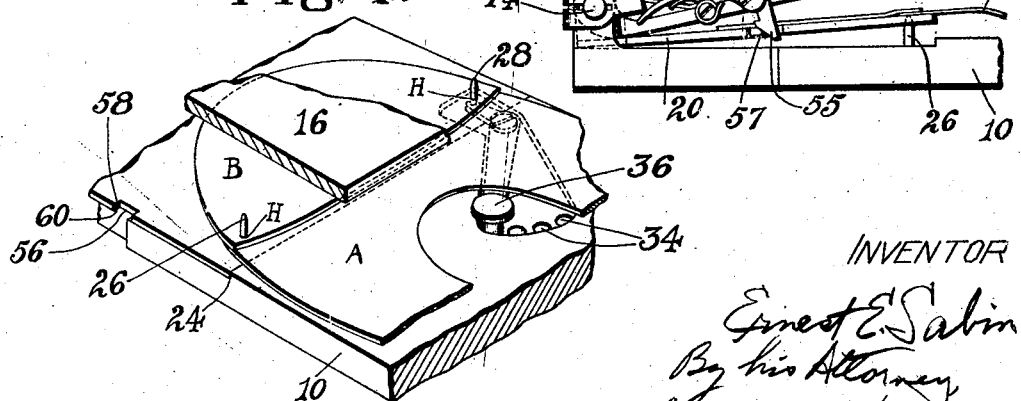
Fig. 4 is a view in perspective, partly in section illustrating especially the particular elements utilized in positioning the tip and vamp.

While the function of the apparatus shown in the drawings has already been indicated, one way in which the apparatus can be employed will now be described briefly. The vamp A and the tip B having each been provided with corresponding jig holes, indicated at H, as for example, when the respective parts are died out, so that these jig holes will be located in exact, predetermined relation to each other and to the contours of the respective parts, all as fully disclosed in the Warren application above identified, the jig pin 28 having been placed, and locked by bolt 36, at the corresponding distance from the jig pin 26, and an adhesive having been applied to the adjacent faces of the vamp A and tip B where they overlap, as illustrated in Figs. 3 and 4, the vamp is first laid upon the work support 10 and stripper 20 while they are in the position shown in Fig. 1 but while the platen 16 is in raised position against stop 50, the jig holes in the vamp being threaded over the jig pins 26, 28. Then the tip B is laid upon the stripper with its jig holes H also threaded over the jig pins 26, 28. In this manner not only the proper amount of overlap of the parts but also their exact relative location will be positively predetermined. Then the operator takes hold of handle 18 and depresses the platen upon the work, pressing the adhesive coated surfaces firmly together. During the downward movement of the platen the end of the spring arm 62 slides off the cam surface 68, being then held by spring 64 against the surface 66 so that the narrow end of latch 55 enters the notch 56 in the stripper and the bell crank 55, 62 is turned until the shoulder 59 snaps under the lower surface 60 of the stripper. The parts will then occupy substantially the positions shown in Fig. 1 except that the vamp and tip will lie between the platen and stripper, as in Figs. 3 and 4. After pressure, exerted through the platen, has been applied to the adhesive-coated parts by the operator for a sufficient period of time to insure the adhesion of those parts, he raises the platen whereupon latch 55 carries the stripper upwardly, lifting the vamp and the tip away from the work support 10 and from the jig pins 26, 28. Preferably, the work between the stripper and platen is released from pressure as soon as the platen starts upwardly, because of a slight clearance between the shoulder 59 and the under surface 60 of the stripper, so that the operator, gripping the vamp with one hand, may pull it from between the stripper and platen as soon as the stripper has risen to the position shown in Fig. 3, shortly after which the bell crank 55, 62, due to the co-action of the arm 62 and the surface 66 of the abutment 63, will have swung counter-clockwise sufficiently to release the surface 60 from the shoulder 59 of the latch so that the stripper falls back, as indicated in Fig. 3, into its normal position upon the work support shown in Figs. 1 and 4, and the platen is moved to its uppermost position against the stop 50 where it is held by spring 48 while new work is being placed in the apparatus.

Although the object and nature of the invention have thus been described at length with reference to a preferred embodiment thereof, it is to be understood that the apparatus may be modified in detail without departing from the spirit and scope of the invention as defined in the following claims.

What I claim as new and desire to secure by Letters Patent of the United States is:—

1. In apparatus for operating on parts of shoes, a work support, a pair of pins projecting vertically from said support and constructed and arranged to enter holes previously formed in each of a plurality of shoe parts, a stripper, an actuator for said stripper, and automatically acting devices for connecting said stripper to and disconnecting it from said actuator.

2. In apparatus for operating on parts of shoes, a stationary, flat work support, a pin projecting from said support and constructed and arranged to penetrate a shoe part lying on said support, a movable platen operatively to engage said part, a stripper, and means for operatively connecting and disconnecting said stripper and said platen.

3. In apparatus for operating on parts of shoes, a work support, a member carried by the work support and constructed and arranged to penetrate a shoe part, a movable platen, a stripper, a latch and means, acting automatically as the platen is moved, to connect and disconnect said stripper and said platen.

4. In apparatus for assembling parts of shoe uppers, a work support, pins projecting from said support and constructed and arranged to enter holes previously formed in each of a plurality of shoe parts, a platen and a stripper each pivoted to the work support and devices through which the platen and the stripper may be operatively connected and disconnected.

5. In apparatus for assembling parts of shoe uppers, a work support, a pair of jig pins projecting from said support and constructed and arranged to enter jig holes in each of a plurality of shoe parts, a platen and a stripper each pivoted to the work support, a latch for connecting and disconnecting said platen and stripper and an abutment for actuating the latch.

6. In apparatus for assembling parts of shoe uppers, a work support, a pair of jig pins projecting from said support and constructed and arranged to enter jig holes in each of a plurality of shoe parts, a platen and a stripper each pivoted to the work support, a bell crank lever pivoted to the platen and having a spring arm and also having a latch to enter a notch in the stripper to lift the stripper, a stationary abutment constructed and arranged to co-operate with the spring arm and cause the latch to release the stripper at a predetermined point in the upward movement of the platen.

7. In apparatus for assembling parts of shoe uppers, a flat, horizontal work support, a pair of relatively adjustable jig pins projecting upwardly from said support, a stripper and a platen pivoted to the work support and each provided with openings for the passage of said pins, the latter being constructed and arranged to aline jig holes in different parts of a shoe upper inserted between the platen and the stripper.

8. In apparatus for assembling parts of shoe uppers, a work support, a member constructed and arranged to enter holes previously formed in each of a plurality of shoe parts being assembled on said support, a platen for pressing said parts together, and a stripper actuated by said platen for removing said parts from said member.

9. In apparatus for operating on parts of shoes, a stationary, flat work support, means for positioning work thereon, a platen and a stripper each pivoted to the work support, means to retain the platen in raised, inoperative position after it has been moved thereto, a latch for connecting and disconnecting said platen and stripper, and an abutment for actuating the latch.

10. In apparatus for operating on parts of shoes, a work support, a pair of pins projecting from said support and constructed and arranged to penetrate a shoe part, a carrier for one of said pins movable to a plurality of predetermined positions at different distances from the other pin and means for retaining the carrier in each of such positions.

11. In apparatus for operating on parts of shoes, a work support, a pair of pins carried by said support and constructed and arranged to penetrate a shoe part, a bell crank lever to which one of the pins is secured and which is mounted in a recess in said support and a locking bolt for retaining the lever in any one of several positions.

12. In apparatus for assembling parts of a shoe upper, a work support, a pair of relatively adjustable pins carried by said support and constructed and arranged to be positioned at different distances apart and to enter and aline a plurality of holes formed in a plurality of shoe parts located in predetermined relation to the contours of said parts and a stripper movable relatively to said support for removing said shoe parts from the pins.

In testimony whereof I have signed my name to this specification.

ERNEST E. SABIN.